Patented June 8, 1954

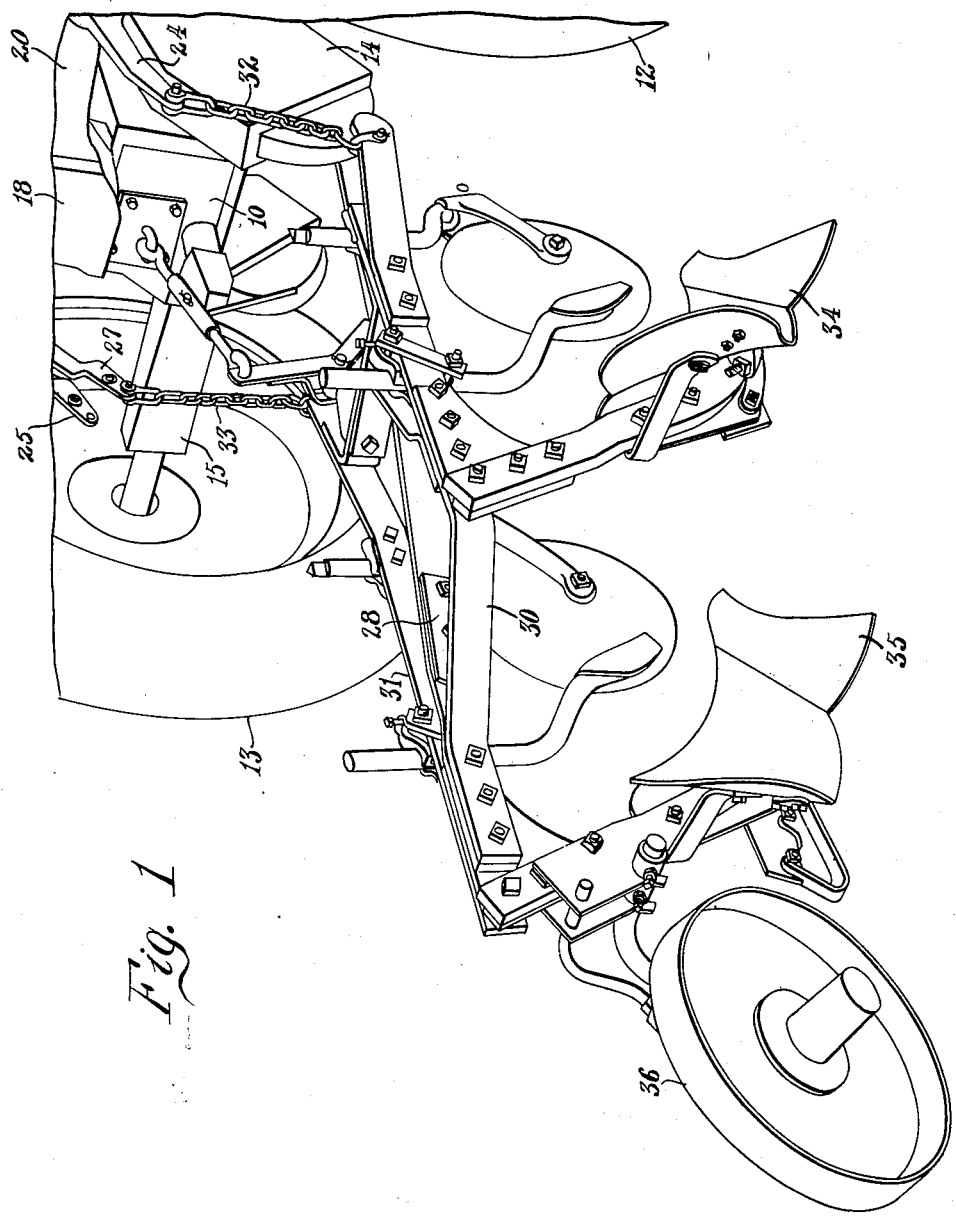

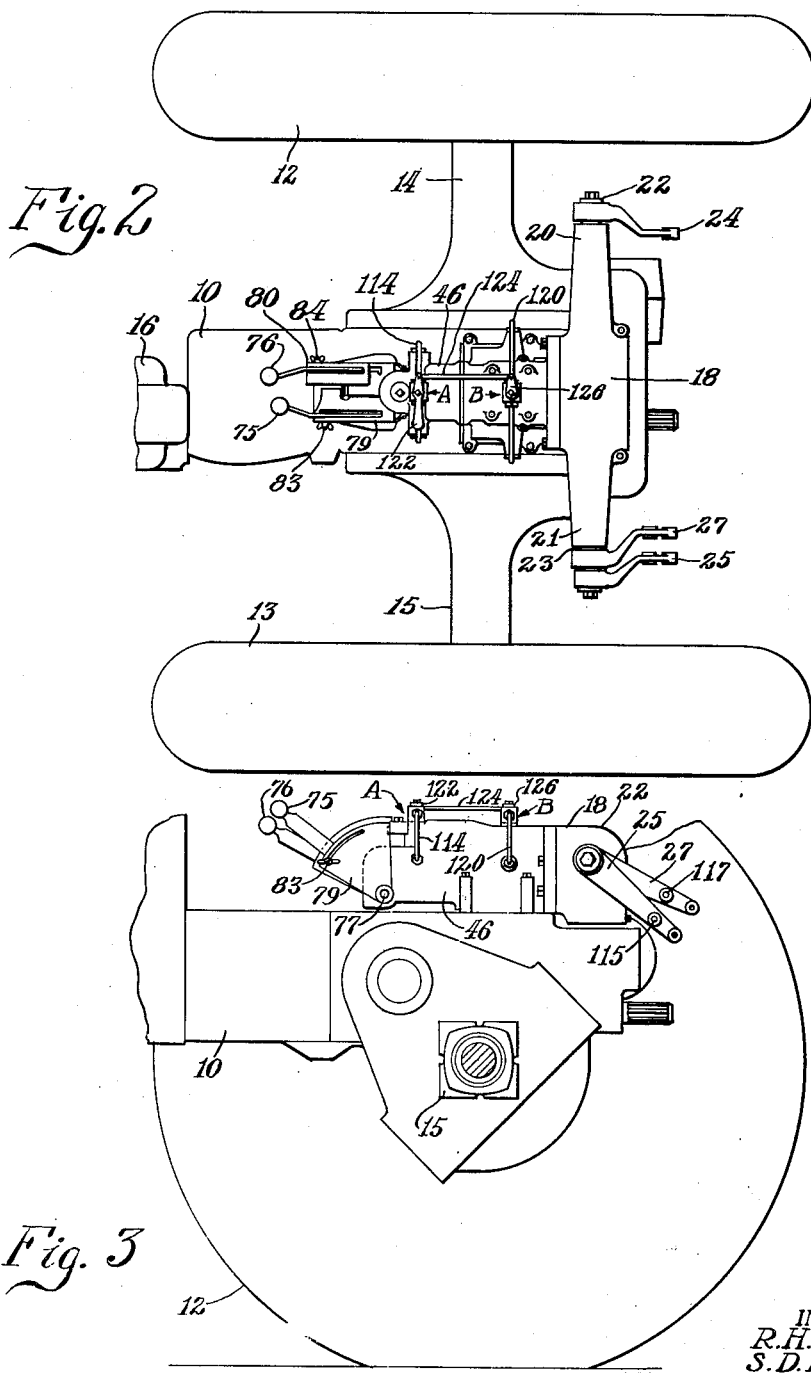

2,680,401

UNITED STATES PATENT OFFICE 2,680,401

MULTIPLE-CIRCUIT HYDRAULIC CONTROL WITH OPTIONAL SEPARATE OR PARALLEL OPERATION

Raymond H. Heller and Stanley D. Liedtke, Dubuque, Iowa, assignors to Deere Manufacturing Co., Dubuque, Iowa, a corporation of Iowa Application February 13, 1952, Serial No. 271,346

15 Claims. (Cl. 97—46.39)

This invention relates to a fluid-pressure power control system for use with agricultural vehicles, such as tractors, with which are conventionally associated agricultural implements of various types.

The availability in the recent past of hydraulic power control systems as either standard or optional equipment on farm tractors has wrought many changes in implement and tractor design and flexibility of operation, all of which are extremely beneficial to the user of agricultural machinery. With the development in the over-all use of hydraulic power control have come many refinements in the power control itself and the extension thereof for use with implements of a type not heretofore considered practicable. Thus, many adjustments and controls once accomplished mechanically or manually are found now to lend themselves to accomplishment by fluid power. Accordingly, the power control systems of today are nicely balanced and extremely flexible systems as compared with the relatively crude but rugged single-purpose power lift of yesterday. But even these systems are not without their faults and constant effort is being exerted in the direction of more and greater improvements.

In one conventional system as now known, the tractor is provided, as either standard or optional equipment, with a fluid motor of the cylinder and piston type powered by a pump driven by the tractor engine and controlled by a selective control valve for regulating, adjusting and otherwise controlling implements on the basis of extension or retraction of the fluid motor piston. For example, cultivators, plows and other tillage tools drawn by or otherwise associated with the tractor may be conveniently controlled by the operator through the exertion of no more force than is required to move the control valve lever. Ordinarily, the fluid motor is operatively connected to a rockshaft at the rear of the tractor and this rockshaft has thereon one or more implement-adjusting arms to which the adjustable part or parts of the implement may be connected. In a conventional modified form of a fluid power system of the general character just described, the tractor is equipped with a pair of rockshafts, preferably coaxial, and each rockshaft has an implement-adjusting arm thereon. The power control system includes a pair of fluid motors, one for each rockshaft, and these motors are included separately in independent fluid-pressure circuits. Thus, the operator has a pair of control valves by means of which he may utilize either circuit independently of or in unison with the other and is accordingly enabled to adjust plural parts associated with the tractor. For example, in the use of some implements, a vertical adjustment relative to the ground is required and at the same time the implement may be of such nature as to require an additional adjustment involving fore-and-aft tilting or even lateral tilting. For the former purpose, one power circuit may be used and the other circuit may be used for the other purpose. Since the circuits are independent, the adjustments may be effected independently or in unison.

A power control system of the type utilizing a single fluid-pressure circuit and a single implement-connectible rockshaft is disclosed in the U. S. patent to Worstell 2,477,710. A system of the multiple-circuit type may be conventionally provided by using two of the Worstell systems or circuits in side-by-side but independent relationship. This requires, of course, the use of two control levers for the two independent control valves.

According to the present invention, there is provided means for combining or paralleling the two normally independent circuits so as to utilize the power of both motors for accomplishing a single adjustment. Of course, the same general result could be achieved by operating both control levers simultaneously with a single adjustable part connected to both power-transmitting rockshafts, but successful operation in this respect depends not only upon the skill of the operator in moving the control levers simultaneously but also upon the elimination of irregularities in operation and design stemming from differences in manufacturing tolerances. For example, one control valve may be slightly different from the other and the wear characteristics of the two may have become so completely different as to cause a variation in function thereof so that accurate synchronism of the two is not readily attainable. Further, there may be sufficient pressure variations in the two circuits to unbalance the adjusting effort on the now combined rockshafts, and it is not unlikely that one or the other of the fluid motors will be subjected to more than its share of the combined operating pressures. In keeping with the fundamental concept of simplifying as far as possible fluid power control systems for agricultural tractors and allied vehicle equipment, the present invention aims at the provision of a system involving the paralleling of two independent circuits in such manner that ultimate control of the single system depends upon the manipulation of only a single control lever, thus eliminating guesswork in the control and avoiding the possibility of accidentally operating the circuits in such manner that one motor acts against the other. It is a further object of the invention to provide paralleling means of such nature as to be readily usable in the conversion of a multiple-circuit system without materially altering the basic design or characteristics of either of the formerly independent circuits.

It is another object of the invention to provide for the paralleling of a pair of independent circuits regardless of the primary sources of fluid pressure for these circuits. For example, in a simple system having two independent circuits, each circuit would have its own pump or source of pressure. In a modified form of system, a single pump would be utilized in conjunction with a flow-divider device incorporating a resistance-compensating valve of the character shown in the patent to Ernst 1,999,834. In either case, the over-all results are substantially the same and both systems are disclosed herein to suggest the flexibility of the application of the principles of the invention.

The foregoing and other important objects inherent in and encompassed by the invention will be apparent from the following detailed description and accompanying sheets of drawings in which:

Figure 1 is a fragmentary perspective view showing a tractor and implement of a character utilizing multiple implement-adjusting members;

Figure 2 is a plan view of the rear portion of a conventional tractor equipped with a multiple-circuit power system and modified according to a preferred embodiment of the present invention;

Figure 3 is a side elevational view (with the near wheel removed) of the tractor shown in Figure 2;

The agricultural vehicle or tractor is of conventional design, including a longitudinal relatively narrow body 10 carried between right- and left-hand traction wheels 12 and 13 by means of right- and left-hand laterally extending axle housings 14 and 15. The tractor may be powered by the usual internal combustion engine (not shown) enclosed ahead of the main body portion 10 by any suitable hood structure, part of which is visible at 16 in Figure 2. This engine provides power not only for driving the tractor but for operating the fluid-pressure control system to be presently described.

Figure 4:
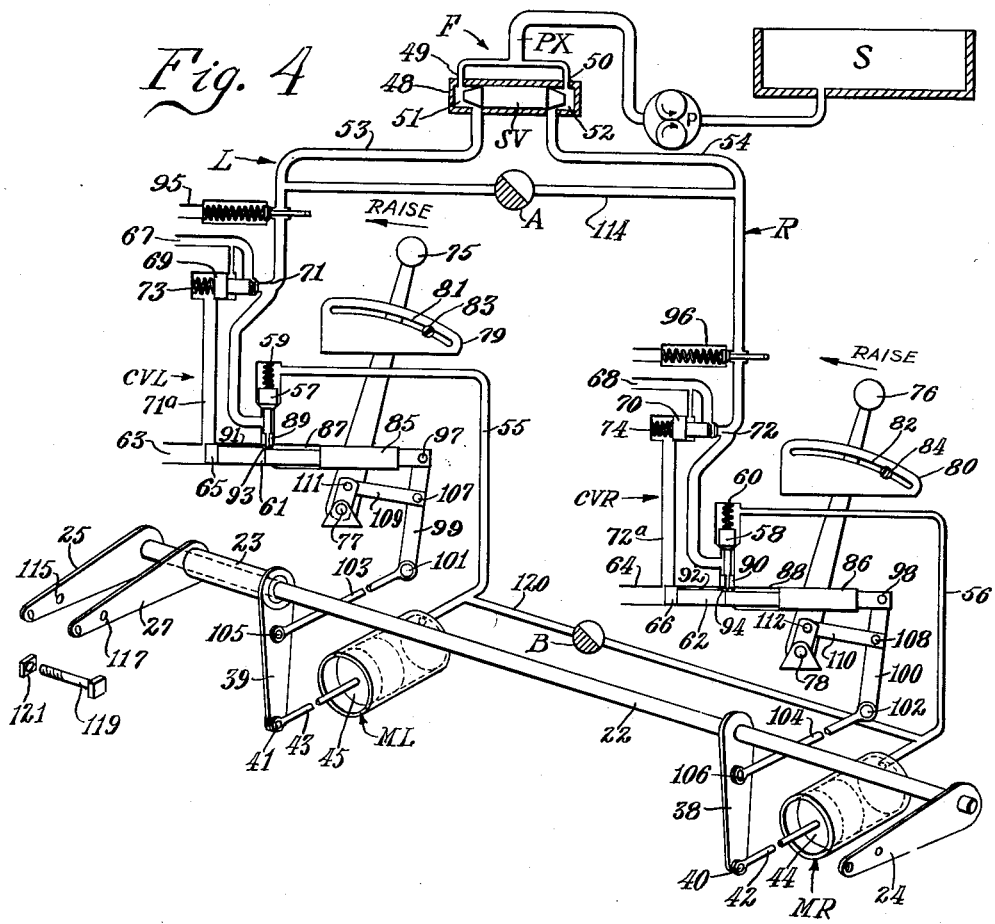
Figure 4 is a schematic layout showing the fundamental components of the multiple-circuit system.

The rear upper portion of the body 10 carries rigidly thereon a power control housing 18 formed integrally with right- and left-hand bearing sleeves 20 and 21 within which are journaled a pair of implement-adjusting members in the form of coaxial rockshafts 22 and 23, the general arrangement of which is best depicted in Figure 4. The rockshaft 22 is relatively long and projects at each of its opposite ends respectively at opposite ends of the bearing sleeves 20 and 21 and has fixed thereto at these opposite ends implement-connectible members in the form of power-transmitting arms 24 and 25 located respectively at the right- and left-hand sides of the tractor. The rockshaft 23 is relatively shorter than the rockshaft 22 and is tubular so as to be telescopically receivable by the rockshaft 22 in such manner that the two rockshafts are relatively movable. Any suitable form of bearing may be utilized between the two rockshafts. These details are unimportant in the present case and the schematic illustration in Figure 4 is deemed to be sufficient for the present purposes. The short or tubular rockshaft has rigid thereon an implement-connectible member in the form of a power-transmitting arm 27. The right- and left-hand arms 24 and 25 move with the rockshaft 22 and the second or left-hand arm 27 moves with the rockshaft 23. Thus, the two sets of arms are available for adjusting plural implement parts associated with the tractor.

In Figure 1, a plow is shown as a representative form of implement. This plow comprises a central beam 28 having its forward end extending beneath the tractor body 10 to an articulate draft connection (not shown) which may be of any suitable design. The plow also includes right- and left-hand secondary beams 30 and 31, the forward ends of which terminate respectively directly below the power arms 24 and 27. The forward end of the right-hand beam 30 is connected by a force-transmitting connection, here a chain 32, to the free end of the arm 24. The forward end of the left-hand beam 31 is similarly connected by a chain 33 to the free end of the arm 27. The plow includes conventional bottoms 34 and 35 and is supported by a rear caster wheel 36. Rocking of the rockshaft 22 will cause angular movement of the arm 24 which will in turn result in adjustment of the right-hand side of the plow. Separate adjustment of the left-hand side of the plow is accomplished by means of the short rockshaft 23, its arm 27 and the connecting chain 33. Such adjustment will tilt or level the plow. If both rockshafts are rocked simultaneously in a clockwise direction (Figure 1), the plow will be lifted bodily from the ground.

The rockshaft 22 is controlled by a fluid-pressure motor of the cylinder and piston type. This motor is designated in Figure 4 by the letters MR. A similar motor ML controls the short rockshaft 23. The operating or force-transmitting connection between the rockshaft 22 and the motor MR may be conventionally provided by an arm 38 rigid at one end on the rockshaft 22 and pivotally connected at 40 at its free end to a piston rod 42 of a piston 44 in the motor. A similar arm 39 is rigid at one end on the rockshaft 23 and is pivotally connected at 41 to a piston rod 43 of a piston 45 in the motor ML. In a commercial design, the motors MR and ML and their connections to the rockshafts 22 and 23 would, of course, be contained within the power control housing 18 and a forward extension 46 thereof. Likewise, the several other components, with the exception of the control valve levers, shown in Figure 4, would be contained within the housing 18—46.

The motor MR is connected to the high side of a right-hand fluid pressure or hydraulic circuit designated generally by the letter R. A similar but independent circuit L has its high side connected to the left-hand motor ML. In that form of power control system shown in Figure 4, there is a single pump or source of pressure P connected at its suction side to a reservoir or sump S. The single pump is connected to the two circuits R and L by means of a flow-dividing device F which incorporates a resistance-compensating valve commonly known as a shuttle valve such as disclosed in the Ernst patent mentioned above.

The device F comprises a housing 48 having left- and right-hand inlets 49 and 50 connected in parallel at PX to the discharge side of the pump. The inlets 49 and 50 lead respectively to left- and right-hand distributing chambers 51 and 52 from which respectively lead high-pressure lines 53 and 54. These high-pressure lines are respectively in the left- and right-hand circuits L and R.

The Ernst patent identified above adequately describes the function and operation of the flow-dividing device F and its associated shuttle valve SV. Therefore, a detailed description will not be presented here. Suffice it to say that the shuttle valve SV is shiftable in opposite directions along its length within the chamber provided by the flow dividing chamber 48 for supplying equal volumetric quantities of fluid to the independent circuits R and L, thus causing the motors MR and ML, which have similar rates of displacement, to operate at the same rate or velocity. For all practical purposes, the circuits R and L may be considered as being independently connected to separate pumps, as suggested in Figure 6, wherein are shown separate pumps PL and PR having their suction sides connected to a reservoir or sump 5A and having their discharge sides connected respectively at 52R and 52L to the high-pressure lines 54 and 53 respectively of the right- and left-hand independent circuits R and L. As to Figure 6, the pumps PR and PL may, of course, have their suction sides connected to separate reservoirs, but the distinction is immaterial here. The applicability of Figure 6 to the basic diagram in Figure 4 may be readily appreciated by superimposing Figure 6 on the upper portion of Figure 4 and eliminating from the system the means F and SV.

Each of the independent hydraulic circuits R and L may be identical to the single circuit in the Worstell patent. In order to clarify the instant disclosure, each of the circuits disclosed here is substantially identical to that shown in Figure 1 of the Worstell patent and accordingly only a brief description of the present arrangement is deemed necessary.

The high side of the circuit R, as previously stated, is connected to the right-hand motor MR and the transmission of fluid between the high and low sides of the circuit and the motor MR is controlled by a control valve designated generally at CVR. The high-pressure line communicates with the motor MR via a motor-circuit connecting line 56 in which is incorporated a check valve 58 as is conventional. This check valve is biased by a spring 60 to closed position to block return flow from the motor MR and is openable by rise in line pressure in the line 54 or by positive action of a shiftable control valve member 62. The control valve member is axially slidable in a bore 64 normally separated from the high-pressure line 54 by the end portion 66 on the member. A by-pass 68 is interposed in the line 54 ahead of the check valve 58 and is controlled by a by-pass valve 70 of the differential-area type. The small-area end of the valve 70 is subjected to line pressure from the line 54 by means of a connecting conduit 72. The opposite or large-area end of the valve 70 is connected to the bore 64 by a passage 72a which is normally separated at 66 from the high-pressure line 54. The valve 70 is backed up by a relatively light spring 74 which is insufficient to overcome line pressure at 72. Accordingly, the by-pass valve 70 is normally open to communicate the high-pressure line 54 to the low side of the circuit via the by-pass 68. Consequently, when the control valve member 62 is in the position of Figure 4, the check valve 58 is closed and the pressure in the line 54 is sufficient only to open the by-pass valve 70 for diverting this pressure to the low side of the circuit.

The control valve member 62 is selectively shiftable in opposite directions from its neutral position as shown. The means for accomplishing shifting may comprise a control lever or control part 76 fulcrumed at 78 on any convenient mounting. This mounting will, in a commercial design, be part of or carried on the power control housing 18—46. The extent of angular movement of the control lever 76 may be regulated by means of a sector 80, rigid on some support such as the housing 18—46 and having therein an arcuate slot 82 within which is adjustably positionable any suitable form of settable stop 84.

The end of the control valve member 62 opposite its end 66 is in the form of an integral cylinder 86 operating in a counterbore 88. The stem of the check valve 58 is fluted at 90 so that the high-pressure line 54 may communicate with the counterbore 88. The control valve member 62 may have an axial flat or groove 92 for communicating the counterbore 88 with the bore 64 when the control valve member is shifted to the left, resulting in communication of the line 54 with the large-area end of the differential by-pass valve 70 via the passage 72a. Setting of the control valve member in this position (to the left) results in closing of the by-pass valve 70 so that the check valve 58 is openable by high pressure in the line 74 and this pressure is transmitted via 56 to the motor MR to cause rocking of the rockshaft 22 in a clockwise direction (Figures 1 and 4).

The right-hand end of the flat or groove 92 in the control valve member 62 communicates with the main body of the control valve member by means of a ramp 94 which is effective to open the check valve 58 against its biasing spring 60 when the control valve member 62 is shifted to the right. The end 66 of the control valve member 62 again cuts off the high-pressure line 54 from the passage 72a and pressure at 72 is sufficient to open the by-pass valve 70. Since the check valve 58 is open, the motor MR will exhaust via 56, 72 and 68 to the low side of the circuit. Pressure in the line 54 will also be by-passed via 72 and 68 to the low side.

When the control valve member is shifted to the left of its neutral position, it occupies an active or motor-activating position. When shifted to the right, it occupies what may be termed an exhaust position. In terms of what will occur in the movement of the implement, shifting of the control valve member 62 to the left will cause raising of the implement and movement of the control valve member to the right will cause lowering of the movement. Since the motor MR is of the one-way type, lowering on the exhaust of the motor is accomplished by the weight of the implement.

Since most control valves conventionally include check valves, further reference herein and in the claims to the control valve generally is to be taken as including the check valve and its functions. In the present instance, the check valve is openable at times by pressure in the line 54 and is openable at other times by positive action of the control valve member 62 because of its ramp 94. It will be understood, of course, that the check valve may be positively opened by the control valve member 62 in either of its positions. These are merely details that do not affect the principles of the present invention.

In addition to the components just described, the circuit R may include a pressure-relief valve 96.

A further characteristic of the circuit as shown in the Worstell patent and as duplicated here is the provision of follow-up mechanism for proportioning the extent of motor operation to the extent of movement or setting of the control lever 76. The representative form of follow-up means shown here is of the mechanical type. The forward or right-hand end of the control valve member 62 has an extenson on which is provided a fulcrum 98 to which is pivotally connected the upper end of a beam 100. The lower end of the beam is pivoted or fulcrumed at 102 to a force-transmitting link 104 which is in turn connected to the power-transmitting arm 38 on the rockshaft 22. The connection between 38 and 104 comprises a pivot 106. The beam 100 has a pivot 108 intermediate its ends for connection to one end of a link 110, the opposite end of which is pivotally connected at 112 to the lower end of the control lever 76.

Thus, with the motor MR hydraulically locked against retraction, the rockshaft arm 38 is fixed, which fixes the fulcrum 102 so that when the lever 76 is moved in either direction, force is transmitted by the link 110 to the beam 100. Since the fulcrum 102 is fixed, force transmitted by movement of the lever 76 will cause movement of the control valve member 62 in the same direction as the lever is moved. If it be assumed that the lever 76 is moved in a rearward or counter-clockwise direction as viewed in Figure 4, the circuit R will be activated so as to close the by-pass 68 and cause extension of the motor MR. The newly set position of the lever 76 establishes the pivot 108 as a fulcrum and as the rockshaft 22 moves angularly in a clockwise direction (Figure 4), force is transmitted through the link or rod 104 to pivot the beam 100 about 108 in a clockwise direction, followed by return movement of the control valve member to the right to reassume its neutral position and thus to deactivate the circuit R. The angular extent of setting of the lever 76 between a zero position and a maximum position determines the extent of operation of the motor MR. For example, the position of the lever 76 in Figure 4 may be considered its zero position and it may have a maximum position at the left-hand end of the arcuate slot 82. This range will be effective for causing upward movement of the implement as the rockshaft 22 moves angularly in a clockwise direction (Figure 4). Similarly, the lever 76 may have a maximum position at the opposite or right-hand end of the slot 72 and any position between the zero position and the latter maximum position may be mechanically determined by setting of the stop 84. Normally, in the use of implements such as plows or cultivators, it is desired, after raising of the plow or cultivator, to lower it to the same ground-working position that it occupied before raising. Therefore, setting of the stop 84 is important, or is at least more important than the provision of a stop for regulating the extent of movement of the lever 76 in a direction to effect raising of the implement.

The activation and deactivation of the left-hand independent circuit L is accomplished by means identical to that just described in connection with the right-hand circuit R. In the interests of brevity, a detailed description of the circuit L will be omitted. However, parts in the left-hand circuit that correspond to parts in the right-hand circuit will be identified in the drawings by uneven reference numerals respectively one digit lower than those used in the right-hand circuit.

Since the circuits R and L are separate (on the basis of either Figure 4 or Figure 6), either of the control levers 75 or 76 may be actuated independently of the other for causing movement of the implement-adjusting arm 27 on the rockshaft 23 regardless of the position of the implement-adjusting arms 24 and 25 on the rockshaft 22. Also, both control levers 75 and 76 may be operated in unison in the same direction or in opposite directions so that the rockshaft 22 is rotated in one direction and the rockshaft 23 is rotated in the opposite direction. Various kinds of implements require dual adjustments of this nature.

It is obvious, of course, that if both rockshafts are connected to the same implement and both control levers 75 and 76 move simultaneously and in the same direction, the lift capacity of the system will be doubled. Under ideal conditions and as a matter of purely theoretical hydraulics, the independent circuits may be simultaneously energized to accomplish a unitary result. However, the problem is a practical one, dealing not with simple independent circuits, but with circuits that incorporate several adjuncts to their superiority over simple circuits. For example, the circuit R includes a control valve having the differential-area by-pass valve 70. This is preferred to the ordinary valve in most instances, particularly when utilized with follow-up mechanism such as that disclosed, because energizing and de-energizing of the circuit is instantaneous. That is to say, it does not depend upon a wide-open valve at one time and a throttled valve at another as would be the case with an ordinary spool valve. Thus, as long as the control valve member 62 is shifted to any distance to the left to communicate the passages 72a and 92 the by-pass valve 70 closes the by-pass 68 and operation of the motor follows instantaneously. Then, when the follow-up mechanism operates to return the control valve member 62 to neutral, there is no throttling and the movement of the rockshaft 22 is uniform throughout its range. These are only examples of the refinements that complicate a simple hydraulic circuit and are representative of what must be taken into consideration in designing a system in which individual or independent circuits can be interconnected in parallel to operate as one.

Another disadvantage in using the two separate circuits as one merely by means of attempting to operate the control valves 61 and 62 simultaneously is that differences in manufacturing tolerances and wear in the valves and connecting linkage might result in the opening or closing of one control valve ahead of the other. It might even be possible to so energize the circuits that one acts in opposition to the other. In any event, the operator is confronted with the task of moving both control levers simultaneously and with precision that results only from long practice, and even this may vary because of differences in wear characteristics as mentioned above.

According to the present invention, these disadvantages are eliminated and it is possible to control the combined single system by means of only one of the two control levers after having previously set the other control lever in a certain position. The preliminary setting of said other control lever is not a disadvantage, for it may be set in that position at any time and may be allowed to remain in that position while the other control is in neutral.

The means for paralleling the two independent circuits R and L so that they may be combined or converted into a single hydraulic power-control system comprises a first auxiliary fluid-pressure line 114 cross-connecting the high sides of the circuits R and L in parallel. A shut-off valve A is provided intermediate the ends of the line 114. As shown in Figure 4, this line is ahead of the control valves CVR and CVL. As respects Figure 4, the line 114, with its valve A open, nullifies the fluid-divider device F and shuttle valve SV and is the equivalent of connecting the single pump P directly to the high-pressure lines 53 and 54. When both control valve members 61 and 62 are in their neutral positions, the by-passes 67 and 68 of both circuits lead to the reservoir and hence the high sides of both circuits are connected respectively to their low sides. Since both check valves 57 and 58 are closed, both motors ML and MR are idle, being hydraulically locked against retraction.

Let it be assumed that the control lever 75 is moved in the direction marked "raise" in Figure 4, resulting in movement of the control valve member 61 to the left to communicate the high-pressure line 53 and the passage 71a that leads to the large-area end of the differential valve 69. The differential valve is shifted to the right (as seen in Figure 4) because of the differential in pressure and the by-pass 67 is closed. If the shut-off valve A in the auxiliary fluid line 114 is closed (as shown), one half of the output of the pump will flow to the motor ML and the other half will go to the low side of the right-hand circuit R through the open by-pass 68; and the motor ML will be operated to the exclusion of the motor MR.

However, if the shut-off valve A is turned to its open position, the high-pressure lines 53 and 54 are communicated in parallel and the flow-dividing device F and shuttle valve SV are nullified. Hence, even though shifting of the left-hand control valve 61 to the left to close the by-pass 67 in the circuit L would normally cause pressure-opening of the check valve 57, that result is not possible at this time, since a connection is made via the auxiliary fluid line 114 and open valve A to the low side of the system through the open by-pass 68 in the circuit R. It follows therefore that the system requires both control valve members 61 and 62 in their "raised" or active positions before the system as a whole will be energized. In other words, once the control valve member 61, for example, has been shifted to the left to its active positions, the control valve member 62 in the circuit R may be shifted to its "raised" or active position at any subsequent time. Since the two circuits are paralleled via the fluid line 114, the motors MR and ML will operate as one and both rockshafts will move simultaneously.

Again, however, practical problems must be considered to avoid minor variations in velocity and lifting pressures in the two motors. Accordingly, it is preferred to mechanically interconnect the two rockshafts. A representative form of means for accomplishing this result is illustrated in Figure 4, wherein it will be seen that the adjacent rockshaft arms 25 and 27 are provided respectively with openings 115 and 117 which may be registered to receive securing means in the form of a bolt 119 having a nut 121. This securing means will be used only when the shut-off valve A is in its open position.

As a further expedient to eliminate possible variations in the circuits when operating as a combined system, the paralleling means includes a second auxiliary fluid line 120 having therein a shut-off valve B. It is contemplated that the valves A and B will be either opened or closed at the same time; that is to say, the valve A should be open when the valve B is open. Since the normally contemplated function of the combined system is one in which the two valves open or close in unison, the two valves may be interconnected to assure such unitary movement. A representative form of interconnection is shown in Figure 2. The valve A may be provided with an operating handle 122, which is connected by a link 124 to an operating arm 126 on the valve B.

The second paralleling or auxiliary line 120 cross-connects the high-pressure lines 53 and 54 in parallel behind the check valves 57 and 58 and ahead of the motors ML and MR. Of course, the paralleling connection could be made directly between the two motors or at any place between the motors and their associated check valves 57 or 58. Other variations will likewise suggest themselves on the basis of the broad principles disclosed.

In the operation of the combined power-control system, the valves A and B are open and the rockshaft arms 25 and 27 are interconnected at 115—121. The rockshaft arms will be connected to a single implement part. For example, the arms may be connected as in Figure 1 for lifting the entire plow bodily from the ground irrespective of tilting adjustment about longitudinal or fore-and-aft axes. It may be assumed that the tractor and plow of Figure 1 are being operated with the plow in plowing position; that is to say, the plow will be lowered into the ground and the control valve members 61 and 62 will be in their neutral positions as shown in Figure 4 irrespective of the positions of the control levers 75 and 76 at their particular time, since, in the achievement of the lowered position, the rockshaft arms 38 and 39 will have returned the control valve members 61 and 62 to their neutral positions. The operator may then move the control lever 75 to the left (in Figure 4) or in its "raise" direction to shift the control valve member 61 to the left. As stated above, this will communicate the passages 91 and 71a and even though the differential by-pass valve 69 operates to close the by-pass 67, communication between the high-pressure line 53 and the low side of the system is available through the open line 114 via the open by-pass 68 in the circuit R. Hence, the plow will continue in its "lower" or operating position until such time as the control lever 76 is moved to its "raise" position to shift the control valve member 62 to the left. This will be followed by the closing of the right-hand by-pass 68 and fluid pressure will be transmitted in parallel to the motors ML and MR via the pressure-opened check vaves 57 and 58 and motor-circuit connections 55 and 56. Equal paralleling is assured by the paralleling connection 120 between the motors and variations due to mechanical differences are eliminated by means of the securing means between the rockshaft arms 25 and 27. Thus, the single combined system has double the capacity of either of the motors ML or MR and raising of the plow may be accomplished by setting of one control lever after a preliminary setting of the other control lever. This is an advantage, because the one control lever may be immediately set in its full active or "raise" position regardless of the delay in subsequently moving the control valve lever 76.

In lowering the plow prior to the raising operation just described, the operator will have selected a desired working depth by adjusting both stops 83 and 84 according to the positions occupied by the control levers 75 and 76 when moved to their "lower" or exhaust positions. Accordingly he may again lower the plow to the same working depth by moving both levers 75 and 76 forwardly or to the right as viewed in Figure 4. Because of the two follow-up mechanisms, the system will be de-energized when both control valve members 61 and 62 are returned to neutral. In this respect, it should be observed that the later of the two control valve members to return to neutral will determine the lowered position of the plow. Thus, if one of the control valve levers is set farther toward its maximum position to the right (Figure 4), it will take longer for the follow-up means to return this control valve member to neutral than it will take the other follow-up means to return the other control valve member to neutral. Stated otherwise, even though one follow-up means returns its control valve member to neutral, a delay in the other follow-up means will mean that the check valve in the other line will still be open to permit exhaust of both motors to the low side of the system. This may be appreciated by considering the following: When both check valves are open, the motors ML and MR exhaust to the low side of the system at the same rate through the two by-passes 67 and 68. However, as soon as one of the control valve members is returned to neutral, one of the by-passes is cut out and both of the motors must discharge through the remaining open by-pass via the paralleling line 120. Accordingly, the rate of lowering is halved after closing of one of the two check valves 57 or 58.

Such half-speed lowering may be availed of through the entire range of lowering. For example, the plow may be raised as a result of the moving of both control levers 75 and 76 to their fully raised position. Of course, after the plow has achieved its raised position, the control valve members 61 and 62 will be returned to neutral. To accomplish half-speed lowering, the operator will move only one control lever—for example, the lever 76—to its lowered position and against its stop 84. Thus, only the check valve 58 will be positively opened and both motors must exhaust through this check valve and through the by-pass 68. As the plow descends at half speed, the left-hand follow-up mechanism will push forwardly on the follow-up link 103, resulting in counterclockwise rocking of the follow-up means 99 about the now fixed pivot 107. This will tend to shift the control valve member 61 to the left to communicate the passages 91 and 71a and thus to close the by-pass 67. But this is immaterial, since the check valve 57 separates the motor from the high side of the system and the high side is discharging to the low side via the open by-pass 68.

Figures 5, 6:
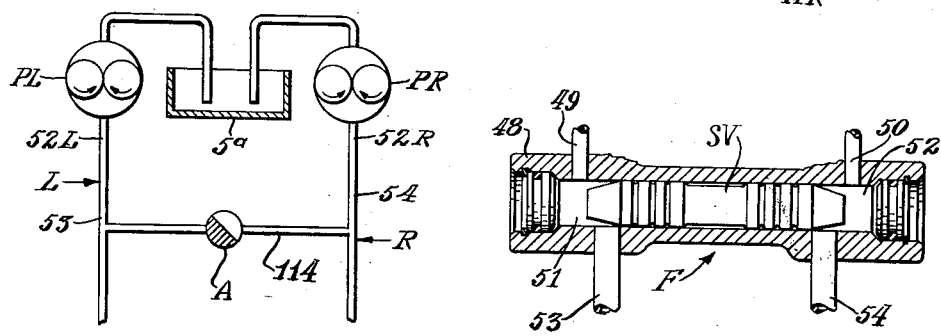
Figure 5 is an enlarged sectional view of one form of resistance-compensating valve.
Figure 6 is a fragmentary schematic view illustrating, as an alternative, the use of two separate pumps in the multiple-circuit system shown in Figure 4.

All of the results achievable in connection with the application of the principles of the invention as illustrated in Figure 4 are available with the modification suggested in Figure 6.

Figures 2 and 3 illustrate the manner in which one conventional system may be paralleled by the addition of the lines 114 and 120 and the shut-off valves A and B, together with the interconnecting linkage if desired. Other systems may be just as readily converted or even designed as original systems on the basis of what is disclosed here. Various other features of the invention not specifically enumerated will also occur to those versed in the art, all without departing from the spirit and scope of the invention.

What is claimed is:

1. In an agricultural vehicle having a pair of relatively movable implement-adjusting members and a pair of separate fluid-pressure power circuits for independently controlling the members to adjust plural implement parts associated with the vehicle, and wherein each circuit includes a motor connected to one of the implement-adjusting members, a pressure source, a reservoir, a pressure line connecting the source and the motor, and a control valve means having a neutral position effecting diversion of the pressure line to the reservoir and blocking of return flow from the motor, each control valve means being selectively settable in an active position to communicate its source with its motor via its pressure line and an exhaust position to exhaust both its source and its motor to its reservoir, the improvement residing in means for selectively converting the two separate circuits into a single fluid-pressure power system, comprising: an auxiliary fluid line for cross-connecting the pressure lines in parallel ahead of the control valves so that setting of either control valve in its active position will result in exhausting its circuit to reservoir via said auxiliary line and the neutrally positioned other control valve, whereby setting of said other control valve in its active position is required to transmit fluid under pressure from both sources to both motors in parallel; and a shut-off valve in the auxiliary line selectively settable in an open position to effect paralleling of the circuits as aforesaid, and in a closed position to separate the two circuits and to preserve the independent characteristics thereof.

2. The invention defined in claim 1, including: a second auxiliary line for cross-connecting the motors in parallel behind the control valves; and a shut-off valve in said second auxiliary line selectively settable in a closed position for separating the motors and in an open position for paralleling of the motors.

3. The invention defined in claim 2, including: means operatively interconnecting the two shut-off valves for incurring position changes thereof in unison.

4. The invention defined in claim 2, including: means for mechanically interconnecting the implement-adjusting members together for operating in unison when both shut-off valves are open.

5. The invention defined in claim 1, including: means for mechanically interconnecting the implement-adjusting members together for operating in unison when the shut-off valve is open.

6. In an agricultural vehicle having a pair of relatively movable implement-adjusting members and a pair of separate fluid-pressure motors connected respectively to and for independently controlling the members to adjust plural implement parts associated with the vehicle, and wherein the vehicle includes a fluid-pressure power system having a single pressure source discharging to a fluid-flow-divider of the type including a resistance-compensating valve providing a pair of separate pressure outlets, and a pair of separate fluid-pressure circuits, each including one of the aforesaid motors plus a pressure line connecting one of said pressure outlets and a motor and a control valve means having a neutral position effecting diversion of the pressure line to the reservoir and blocking of return flow from the motor, each control valve means being selectively settable in an active position to communicate its source with its motor via its pressure line and an exhaust position to exhaust both its source and its motor to the reservoir, the improvement residing in means for selectively converting the two separate circuits into a single fluid-pressure power system, comprising: an auxiliary fluid line for cross-connecting the pressure lines in parallel ahead of the control valves and behind the fluid-flow-divider device to nullify the flow-dividing and resistance-compensating characteristics of said device so that setting of either control valve in its active position will result in exhausting its circuit to reservoir via said auxiliary line and the neutrally positioned other control valve, whereby setting of said other control valve in its active position is required to transmit fluid under pressure from both sources to both motors in parallel; and a shut-off valve in the auxiliary line selectively settable in an open position to effect paralleling of the circuits as aforesaid, and in a closed position to separate the two circuits and to preserve the independent characteristics thereof.

7. A fluid-pressure power control system for an agricultural vehicle, comprising: a pair of relatively movable force-transmitting members movable on the vehicle; first and second separate fluid-pressure power circuits on the vehicle and respectively having first and second motors connected respectively to the members for moving the members to adjust plural implement parts associated with the vehicle; each circuit including, in addition to its motor, a pressure source, a reservoir, a pressure line connecting the source and the motor, and a control valve means having a neutral position effecting diversion of the pressure line to the reservoir and blocking of return flow from the motor, each control valve means being selectively settable in an active position to communicate its source with its motor via its pressure line and an exhaust position to exhaust both its source and its motor to its reservoir, means for selectively converting the two separate circuits into a single fluid-pressure power system, including an auxiliary fluid line for cross-connecting the pressure lines in parallel ahead of the control valves so that setting of either control valve in its active position will result in exhausting its circuit to reservoir via said auxiliary line and the neutrally positioned other control valve, whereby setting of said other control valve in its active position is required to transmit fluid under pressure from both sources to both motors in parallel; and a shut-off valve in the auxiliary line selectively settable in an open position to effect paralleling of the circuits as aforesaid, and in a closed position to separate the two circuits and to preserve the independent characteristics thereof.

8. The invention defined in claim 7, including: a second auxiliary line for cross-connecting the motors in parallel behind the control valves; and a shut-off valve in said second auxiliary line selectively settable in a closed position for separating the motors and in an open position for effecting paralleling of the motors.

9. The invention defined in claim 8, including: means operatively interconnecting the two shut-off valves for incurring position changes thereof in unison.

10. The invention defined in claim 8, including: means for mechanically interconnecting the implement-adjusting members together for operating in unison when both shut-off valves are open.

11. The invention defined in claim 7, including: means for mechanically interconnecting the implement-adjusting members together for operating in unison when the shut-off valve is open.

12. In an agricultural vehicle having a pair of relatively movable implement-adjusting members and a pair of separate fluid-pressure power circuits for independently controlling the members to adjust plural implement parts associated with the vehicle, and wherein each circuit includes a motor connected to one of the implement-adjusting members, a pressure source, a reservoir, a pressure line connecting the source and the motor, and a control valve means having a neutral position effecting diversion of the pressure line to the reservoir and blocking of return flow from the motor, each control valve means being selectively settable in an active position to communicate its source with its motor via its pressure line and an exhaust position to exhaust both its source and its motor to its reservoir, each control valve means having an adjustable control element selectively settable in varying amounts from zero to a maximum to determine the effectiveness of the active position of the associated control valve to communicate the associated pressure source and motor, and a pair of separate follow-up mechanisms, each connected independently of the other between a motor and its control element for returning the associated control valve to its neutral position after operation of the associated motor through an extent proportional to the setting of the associated control element, the improvement residing in means for selectively converting the two separate circuits into a single fluid-pressure power system, comprising: an auxiliary fluid line for cross-connecting the pressure lines in parallel ahead of the control valves so that setting of either control valve in its active position will result in exhausting its circuit to reservoir via said auxiliary line and the neutrally-positioned other control valve, whereby setting of said other control valve in its active position is required to transmit fluid under pressure from both sources to both motors in parallel for effecting operation of the motors in unison to an extent determined by that control element having the setting closer to zero; and a shut-off valve in the auxiliary line selectively settable in an open position to effect paralleling of the circuit as aforesaid, and in a closed position to separate the two circuits and to preserve the independent characteristics thereof.

13. A fluid-pressure power control system for an agricultural vehicle, comprising: a pair of relatively movable force-transmitting members movable on the vehicle; first and second separate fluid-pressure power circuits on the vehicle and respectively having first and second motors connected respectively to the members for moving the members to adjust plural implement parts associated with the vehicle; each circuit including in addition to its motor a pressure source, a reservoir, a pressure line connecting the source and the motor, and a control valve means having a neutral position effecting diversion of the pressure line to the reservoir and blocking of return flow from the motor, each control valve means being selectively settable in an active position to communicate its source with its motor via its pressure line and an exhaust position to exhaust both its source and its motor to its reservoir; each control valve means having an adjustable control element selectively settable in varying amounts from zero to a maximum to determine the effectiveness of the active position of the associated control valve to communicate the associated pressure source and motor; a pair of separate follow-up mechanisms, each connected independently of the other between a motor and its control element for returning the associated control valve to its neutral position after operation of the associated motor through an extent proportional to the setting of the associated control element; means for selectively converting the two separate circuits into a single fluid-pressure power system, including an auxiliary fluid line for cross-connecting the pressure lines in parallel ahead of the control valves so that setting of either control valve in its active position will result in exhausting its circuit to reservoir via said auxiliary line and the neutrally positioned other control valve, whereby setting of said other control valve in its active position is required to transmit fluid under pressure from both sources to both motors in parallel for effecting operation of the motors in unison to an extent determined by that control element having the setting closer to zero; and a shut-off valve in the auxiliary line selectively settable in an open position to effect paralleling of the circuits as aforesaid, and in a closed position to separate the two circuits and to preserve the independent characteristics thereof.

14. In an agricultural vehicle having a pair of relatively movable members respectively connectible to plural implement parts associated with the vehicle and a pair of separate fluid pressure power circuits for respectively controlling the members, wherein the high side of each circuit is connected to a fluid motor having a force-transmitting connection to one of the implement-connectible parts, each circuit having a by-pass from its high side to its low side controlled by a by-pass valve of the differential-area type selectively subject to line pressure at its small area only to open the by-pass or at both its small and large areas to close the by-pass, and a pair of separate control valves, one for each circuit and selectively settable in a neutral position to cause the associated by-pass valve to open its by-pass or in an active position causing said associated by-pass valve to close its by-pass, the improvement residing in means for selectively converting the two separate circuits into a single fluid-pressure power system, comprising: an auxiliary fluid-pressure line connecting the high sides of the circuits in parallel for diverting line pressure from whichever circuit has its control valve in active position to the low side of the other circuit via the by-pass of said other circuit when the control valve of said other circuit is in its neutral position so that either control valve may be preliminarily and separately set in its active position and the single system controlled by the other valve to operate both motors in unison; and a shut-off valve in the auxiliary line selectively settable in an open position to effect paralleling of the circuits as aforesaid, and in a closed position to separate the two circuits and to preserve the independent characteristics thereof.

15. In an agricultural vehicle having a pair of relatively movable members respectively connectible to plural implement parts associated with the vehicle and a pair of separate fluid-pressure power circuits for respectively controlling the members, wherein the high side of each circuit is connected to a fluid motor having a force-transmitting connection to one of the implement-connectible parts, each motor-circuit connection including an openable check valve normally closed to block return flow from the associated motor, each circuit having a by-pass from its high side to its low side controlled by a by-pass valve of the differential-area type selectively subject to line pressure at its small area only to open the by-pass or at both its small and large areas to close the by-pass, and a pair of separate control valves, one for each circuit and each having a neutral position to cause the associated by-pass valve to open its by-pass and each being selectively settable in an active position causing said associated by-pass valve to close its by-pass and for opening the associated check valve and an exhaust position to open said check valve and to cause opening of said by-pass for exhausting both the associated motor and the high side of the circuit to the low side of said circuit, the improvement residing in means for selectively converting the two separate circuits into a single fluid-pressure power system, comprising: a first auxiliary fluid-pressure line connecting the high sides of the circuits in parallel ahead of the check valves for diverting line pressure from whichever circuit has its control valve in active position to the low side of the other circuit via the by-pass of said other circuit when the control valve of said other circuit is in its neutral position so that either control valve may be preliminarily and separately set in its active position and the single system controlled by the other valve to operate both motors in unison; a shut-off valve in the auxiliary line selectively settable in an open position to effect paralleling of the circuits as aforesaid, and in a closed position to separate the two circuits and to preserve the independent characteristics thereof; a second auxiliary fluid line for cross-connecting the high sides of the circuits in parallel behind the check valves; and a shut-off valve in said second auxiliary line selectively settable in a closed position for separating the motors and in an open position for effecting paralleling of the motors.

References Cited in the file of this patent

UNITED STATES PATENTS

| Number | Name | Date |
| --- | --- | --- |
| 718,973 | Du Bois-Raymond | Jan. 27, 1903 |
| 988,813 | Procknow | Apr. 4, 1911 |
| 1,999,834 | Ernst | Apr. 30, 1935 |
| 2,148,543 | Dinzl | Feb. 28, 1939 |
| 2,266,921 | Trautman | Dec. 23, 1941 |
| 2,343,912 | Lauck | Mar. 14, 1944 |
| 2,363,292 | Brown | Nov. 21, 1944 |
| 2,383,689 | Silver | Aug. 28, 1945 |
| 2,477,710 | Worstell | Aug. 2, 1949 |